US012776246B2

(12) United States Patent
Kim et al.

(10) Patent No.: US 12,776,246 B2
(45) Date of Patent: Oct. 27, 2026

(54) VIEWING ANGLE SWITCHABLE DISPLAY DEVICE INCLUDING IMAGE DATA DIVIDING PART

(71) Applicant: LG Display Co., Ltd., Seoul (KR)

(72) Inventors: Sang-Gyu Kim, Paju-si (KR); Su-Hyuk Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/313,573

(22) Filed: Aug. 28, 2025

(65) Prior Publication Data

US 2026/0120612 A1 Apr. 30, 2026

(30) Foreign Application Priority Data

Oct. 31, 2024 (KR) ........................ 10-2024-0152236

(51) Int. Cl.
*G09G 3/20* (2006.01)
*G09G 3/3233* (2016.01)

(52) U.S. Cl.
CPC ......... *G09G 3/2092* (2013.01); *G09G 3/2074* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/068* (2013.01); *G09G 2340/10* (2013.01); *G09G 2358/00* (2013.01)

(58) Field of Classification Search
None
See application file for complete search history.

(56) References Cited

FOREIGN PATENT DOCUMENTS

| | | | | |
|---|---|---|---|---|
| EP | 4411713 | A1 * | 8/2024 | .......... G09G 3/3233 |
| KR | 10-2007-0104076 | A | 10/2007 | |
| KR | 10-2013-0095574 | A | 8/2013 | |
| KR | 10-2024-0084905 | A | 6/2024 | |

* cited by examiner

*Primary Examiner* — Brian M Butcher
(74) *Attorney, Agent, or Firm* — Birch, Stewart, Kolasch & Birch, LLP

(57) ABSTRACT

A viewing angle switchable display device can include a timing controlling unit configured to generate shared image data, private image data, a data control signal and a gate control signal from an interface signal corresponding to mixed image data, a data enable signal, a shared data enable signal and a private data enable signal received from an image processing unit, a data driving unit configured to generate a shared data signal and a private data signal using the shared image data, the private image data and the data control signal, a gate driving unit configured to generate a gate signal using the gate control signal, and a display panel including a shared subpixel and a private subpixel and configured to display an image using the shared data signal, the private data signal and the gate signal.

17 Claims, 5 Drawing Sheets

VIEWING ANGLE SWITCHABLE DISPLAY DEVICE INCLUDING IMAGE DATA DIVIDING PART

CROSS-REFERENCE TO RELATED APPLICATION

The present application claims the priority to Korean Patent Application No. 10-2024-0152236, filed in the Republic of Korea on Oct. 31, 2024, which is hereby incorporated by reference in its entirety.

BACKGROUND

Field of the Disclosure

The present disclosure relates to a display device, and more particularly, to a viewing angle switchable display device including an image data dividing part dividing mixed image data received from an image processing unit into shared image data and private image data.

Description of the Related Art

Recently, with the advent of an information-oriented society, the interest in information displays for processing and displaying a massive amount of information and the demand for portable information media have increased. Further, as a request for using a portable information media increases, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

Specifically, the OLED display device has been used for a dashboard of a vehicle. In a field of a vehicle, a viewing angle switchable display device where a driver and a passenger selectively watch an image has been researched and developed.

In a viewing angle switchable OLED display device, a shared image is displayed with a wide viewing angle or a private image is displayed with a narrow viewing angle using a film or a lens.

As a result, shared image data and private image data are transmitted from an image processing unit to a display device. As an amount of the image data and a speed of a clock signal increase, a property of an electromagnetic interference can be deteriorated, and a noise can be generated in a transmission. As result, a display quality of an image can be deteriorated.

SUMMARY OF THE DISCLOSURE

Accordingly, the present disclosure is directed to a display device that substantially obviates one or more of the problems due to limitations and disadvantages of the related art.

The present disclosure is to provide a viewing angle switchable display device where a display quality of an image is improved by dividing mixed image data into shared image data and private image data.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a viewing angle switchable display device includes a timing controlling unit configured to generate shared image data, private image data, a data control signal and a gate control signal from an interface signal corresponding to mixed image data, a data enable signal, a shared data enable signal and a private data enable signal received from an image processing unit; a data driving unit configured to generate a shared data signal and a private data signal using the shared image data, the private image data and the data control signal; a gate driving unit configured to generate a gate signal using the gate control signal; and a display panel including a shared subpixel and a private subpixel and configured to display an image using the shared data signal, the private data signal and the gate signal.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate embodiments of the disclosure and together with the description serve to explain the principles of the disclosure.

In the Drawings.

DETAILED DESCRIPTION OF THE EMBODIMENTS

Figure 1:
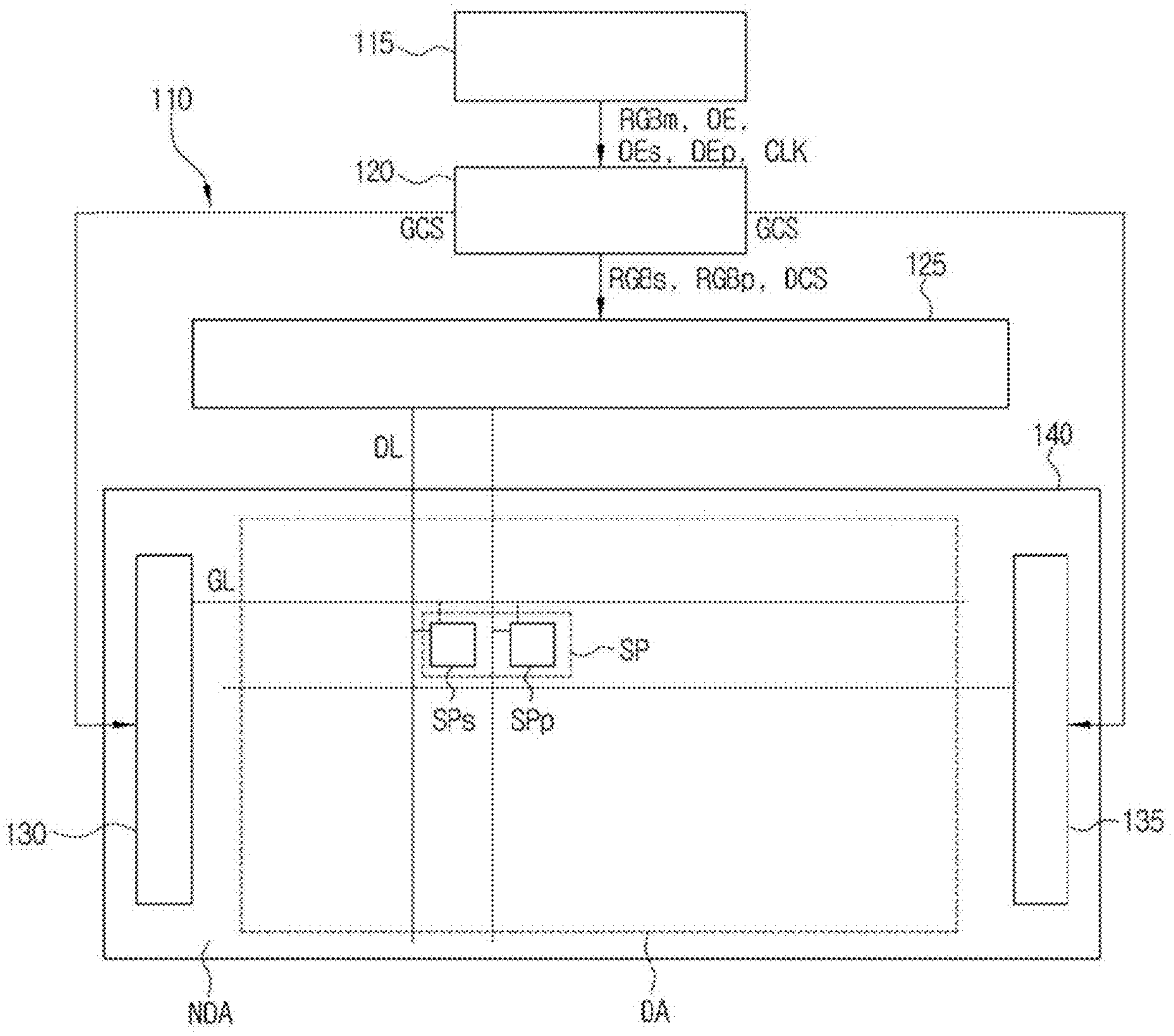
FIG. 1 is a view showing a viewing angle switchable display device according to an embodiment of the present disclosure.

Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure can be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example aspects of the present disclosure, are merely given by way of example. Therefore, the present disclosure is not limited to the illustrations in the drawings. Like reference numerals refer to like elements throughout the disclosure, unless otherwise specified.

In the following description, where the detailed description of the relevant known function or configuration can unnecessarily obscure a feature or aspect of the present disclosure, a detailed description of such known function or configuration can be omitted or a brief description can be provided.

Where the terms “comprise,” “have,” “include,” and the like are used, one or more other elements can be added unless the term, such as “only,” is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using “on,” “over,” “under,” “above,” “below,” “beside,” “next,” or the like, one or more other parts can be located between the two parts unless a more limiting term, such as “immediate(ly),” “direct(ly),” or “close(ly)” is used. For example, where an element or layer is disposed “on” another element or layer, a third layer or element can be interposed therebetween.

Although the terms “first,” “second,” A, B, (a), (b), and the like can be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term “at least one” should be understood to include all combinations of one or more of related elements. For example, the term of “at least one of first, second and third elements” can include all combinations of two or more of the first, second and third elements as well as the first, second or third element. Further, the term “can” fully encompasses all the meanings and coverages of the term “may” and vice versa. In addition, the term “data” covers both a singular data and plural data.

The term “display device” can include a display device in a narrow sense such as liquid crystal module (LCM), an organic light emitting diode (OLED) module and a quantum dot (QD) module including a display panel and a driving unit for driving the display panel. In addition, the term “display device” can include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure can include an applied product or a set device of a final user’s device including the LCM, the OLED module and the QD module as well as a display device in a narrow sense such as the LCM, the OLED module and the QD module.

According to circumstances, the LCM, the OLED module and the QD module having a display panel and a driving unit can be expressed as “a display device”, and an electronic apparatus of a complete product including the LCM, the OLED module and the QD module can be expressed as “a set device.” For example, a display device in a narrow sense can include a display panel of a liquid crystal, an organic light emitting diode and a quantum dot and a source printed circuit board (PCB) of a control unit for driving the display panel, and a set device can further include a set PCB of a set control unit electrically connected to the source PCB for controlling the entire set device.

The display panel of the present disclosure can include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel can include a plurality of gate lines, a plurality of data lines and a subpixel in a crossing region of the plurality of gate lines and the plurality of data lines. The display panel can include an array having a thin film transistor of an element for selectively applying a voltage to each subpixel, an emitting element layer on the array and an encapsulating substrate or an encapsulation part covering the emitting element layer. The encapsulation part can protect the thin film transistor and the emitting element layer from an external impact and can prevent or at least reduce penetration of a moisture or oxygen into the emitting element layer. In addition, the emitting element layer on the array can include an inorganic light emitting layer, for example, a nano-sized material layer or a quantum dot.

The thin film transistor of the present disclosure can include one of an oxide thin film transistor, an amorphous silicon thin film transistor, and a low temperature polycrystalline silicon thin film transistor.

Features of various embodiments of the present disclosure can be partially or entirely coupled to or combined with each other. They can be linked and operated technically in various ways as those skilled in the art can sufficiently understand. The aspects can be carried out independently of or in association with each other in various combinations.

Hereinafter, a display device according to various example embodiments of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings. All the components of each display device/apparatus according to all embodiments of the present disclosure are operatively coupled and configured.

FIG. 1 is a view showing a viewing angle switchable display device according to an embodiment of the present disclosure. Although the display device can be an organic light emitting diode (OLED) display device, it is not limited thereto. For example, the display device can be a quantum dot (QD) display device, a micro light emitting diode (LED) display device or a mini light emitting diode (LED) display device.

Referring to FIG. 1, a viewing angle switchable display device 110 according to an embodiment of the present disclosure includes a timing controlling unit 120 (e.g., a circuit), a data driving unit 125 (e.g., a circuit), first and second gate driving units 130 and 135 (e.g., circuits) and a display panel 140.

The timing controlling unit 120 is connected to an image processing unit 115 of an external system such as a graphic card or a television system. The image processing unit 115 generates mixed image data RGBm and a plurality of timing signals such as a data enable signal DE, a shared data enable signal DEs, a private data enable signal DEp and a clock signal CLK using an image signal and transmits the mixed image data RGBm and the plurality of timing signals such as the data enable signal DE, the shared data enable signal DEs, the private data enable signal DEp and the clock signal CLK to the timing controlling unit 120.

For example, the image processing unit 115 can transmit the mixed image data RGBm and the plurality of timing signals to the timing controlling unit 120 through an interface signal such as a low voltage differential signaling (LVDS) and an embedded display port (EDP).

Although the external system includes the image processing unit 115 in the embodiment of FIG. 1, the display device 110 can include the image processing unit 115 in another embodiment.

The timing controlling unit 120 generates shared image data RGBs, private image data RGBp, a data control signal DCS and a gate control signal GCS using the mixed image data RGBm and the plurality of timing signals including the data enable signal DE, the shared data enable signal DEs, the private data enable signal DEp and the clock signal CLK received from the image processing unit 115.

The timing controlling unit 120 transmits the shared image data RGBs, the private image data RGBp and the data control signal DCS to the data driving unit 125 and transmits the gate control signal GCS to the first and second gate driving units 130 and 135.

The data driving unit 125 generates a shared data signal (a shared data voltage) Vdas (of FIG. 2) and a private data signal (a private data voltage) Vdap (of FIG. 2) using the shared image data RGBs, the private image data RGBp and the data control signal DCS transmitted from the timing controlling unit 120 and applies the shared data signal Vdas and the private data signal Vdap to a data line DL of the display panel 140.

The first and second gate driving units 130 and 135 generate a gate signal (a gate voltage) Sc1, Sc2 and Em (of FIG. 2) using the gate control signal GCS transmitted from the timing controlling unit 120 and applies the gate signal Sc1, Sc2 and Em to a gate line GL of the display panel 140.

The first and second gate driving units 130 and 135 can have a gate in panel (GIP) type to be formed in a non-display area NDA of a substrate of the display panel 140 having the gate line GL, the data line DL and a pixel P.

Although the first and second gate driving units 130 and 135 are disposed in both side portions of the display panel 140 in the embodiment of FIG. 1, one gate driving unit can be disposed in one side portion of the display panel 140 in another embodiment.

The display panel 140 includes a display area DA (or active area) at a central portion thereof and a non-display area NDA surrounding the display area DA. The display panel 140 displays an image using the gate signal Sc1, Sc2 and Em, the shared data signal Vdas and the private data signal Vdap. For displaying an image, the display panel 140 includes a plurality of subpixels SP, a plurality of gate lines GL and a plurality of data lines DL in the display area DA.

Each of the plurality of subpixels SP includes a shared subpixel SPs for displaying a shared image IMs (of FIG. 6B) of a wide viewing angle and a private subpixel SPp for displaying a private image IMp (of FIG. 6C) of a narrow viewing angle, and the gate line GL and the data line DL cross each other to define the shared subpixel SPs and the private subpixel SPp. Each of the shared subpixel SPs and the private subpixel SPp is connected to the gate line GL and the data line DL.

For example, a hemicylindrical lens that focuses a light along up and down directions toward a front direction and does not focus a light along left and right directions is disposed on the display panel 140 corresponding to the shared subpixel SPs, and a hemispherical lens that focuses a light along up, down, left and right directions toward a front direction is disposed on the display panel 140 corresponding to the private subpixel SPp.

Among the plurality of subpixels SP, some constituting a white color constitute one pixel.

For example, first, second and third subpixels corresponding to red, green and blue colors among the plurality of subpixels SP can constitute one pixel, or first, second, third and fourth subpixels corresponding to red, green, blue and white colors among the plurality of subpixels can constitute one pixel.

Each of the shared subpixel SPs and the private subpixel SPp can include a plurality of transistors such as a switching transistor, a driving transistor and a sensing transistor, a storage capacitor and a light emitting diode.

Figure 5:
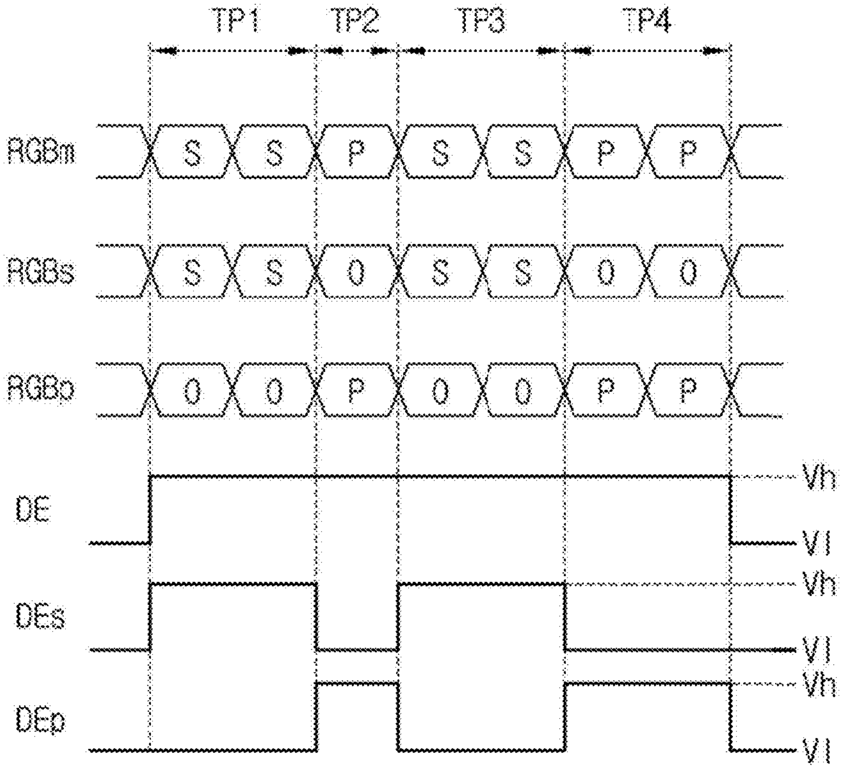
FIG. 5 is a view showing a plurality of signals of a viewing angle switchable display device according to an embodiment of the present disclosure.
Figure 6A:
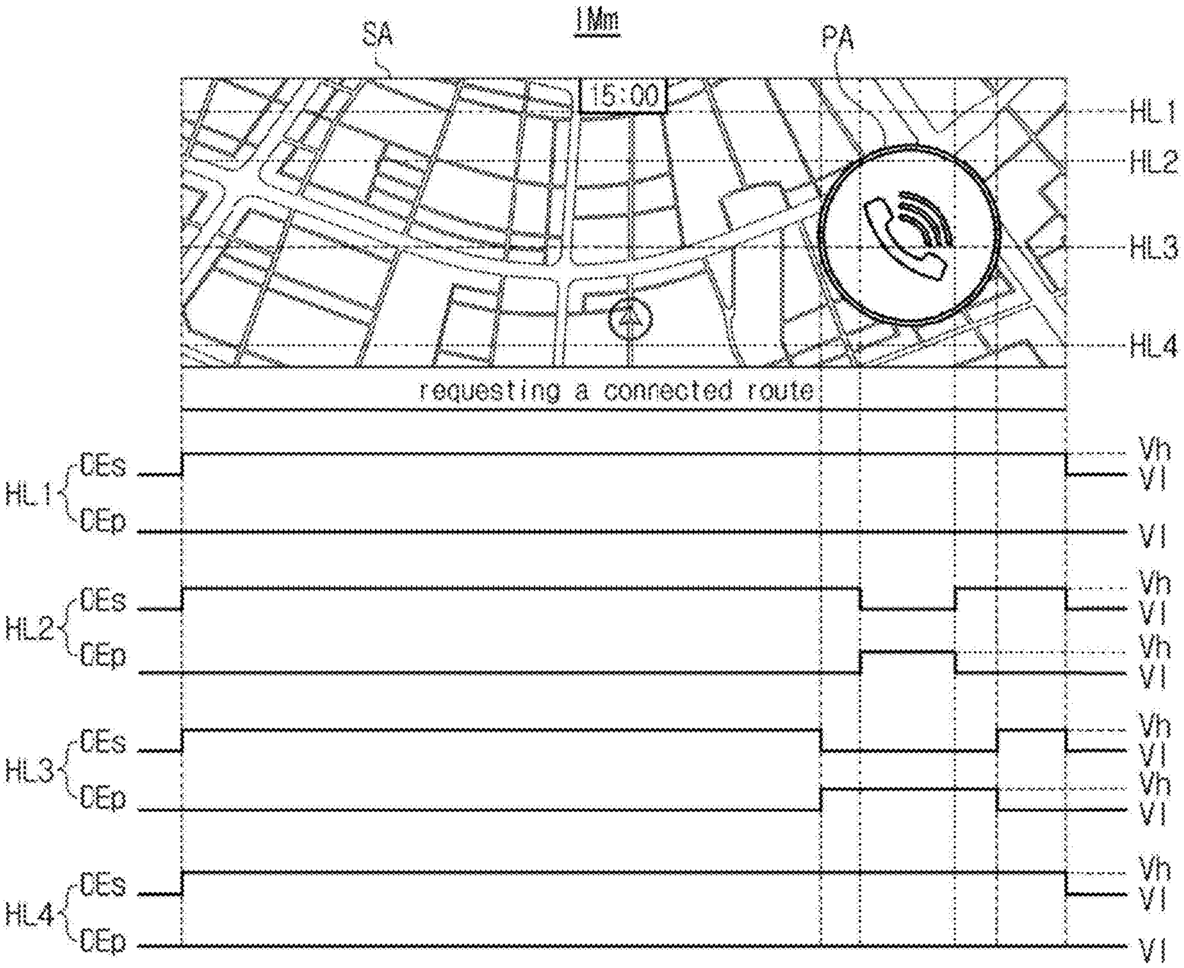
FIG. 6A is a view showing a mixed image, a shared data enable signal and a private data enable signal of a viewing angle switchable display device according to an embodiment of the present disclosure.

In the viewing angle switchable display device 110, the display area DA of the display panel 140 is classified into a shared area SA (of FIG. 6A) and a private area PA (of FIG. 6A). The shared data signal Vdas (of FIG. 2) corresponding to the shared image RGBs (of FIG. 5) is applied to the shared subpixel SPs of the shared area SA, and the private data signal Vdap (of FIG. 2) corresponding to a black gray level is applied to the private subpixel SPp of the shared area SA. Further, the shared data signal Vdas corresponding to the black gray level is applied to the shared subpixel SPs of the private area PA, and the private data signal Vdap corresponding to the private image data RGBp (of FIG. 5) is applied to the private subpixel SPp of the private area PA.

As a result, the display panel 140 of the viewing angle switchable display device 110 can display a shared image IMs of a wide viewing angle corresponding to the shared image data RGBs through the shared area SA of the display area DA. At the same time, the display panel 140 of the viewing angle switchable display device 110 can display a private image IMp of a narrow viewing angle corresponding to the private image data RGBp through the private area PA of the display area DA.

Figure 2:
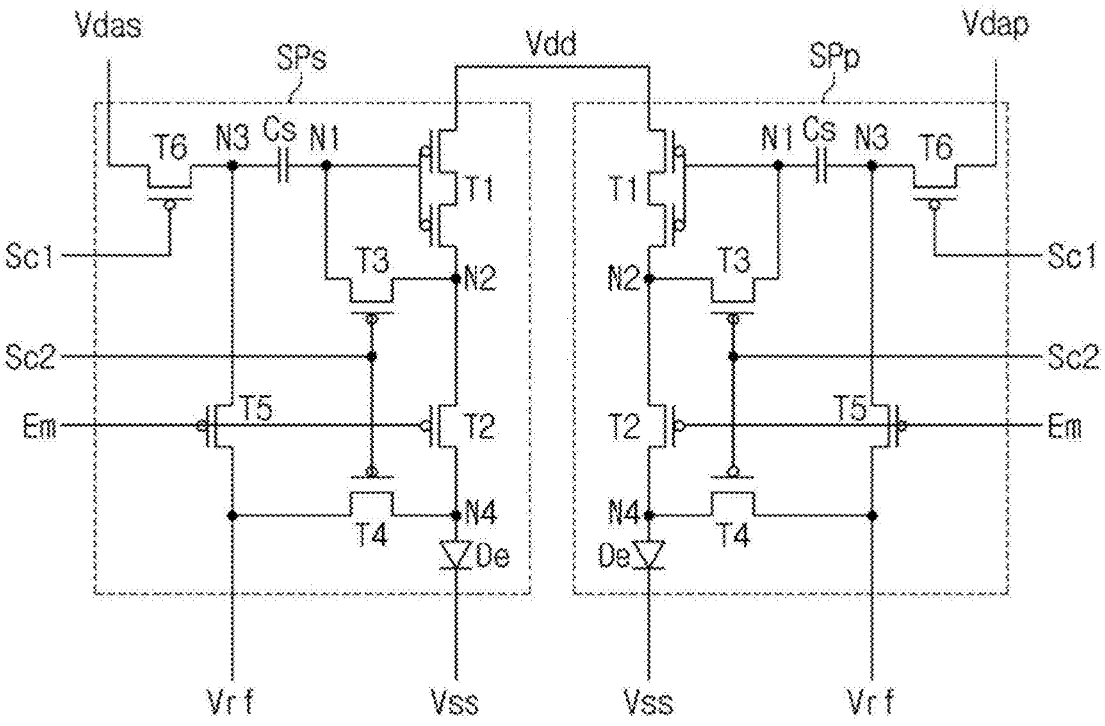
FIG. 2 is a circuit diagram showing a shared subpixel and a private subpixel of a viewing angle switchable display device according to an embodiment of the present disclosure.

FIG. 2 is a circuit diagram showing a shared subpixel and a private subpixel of a viewing angle switchable display device according to an embodiment of the present disclosure.

Referring to FIG. 2, each of the shared subpixel SPs and the private subpixel SPp of the display panel 140 of the viewing angle switchable display device 110 according to an embodiment of the present disclosure includes first to sixth transistors T1 to T6, a storage capacitor Cs and a light emitting diode De.

For example, the first to sixth transistors T1 to T6 can be P-type transistors.

The first transistor T1 as a driving transistor is switched according to a voltage of a first capacitor electrode of the storage capacitor Cs. A gate electrode of the first transistor T1 is connected to a first node N1, a source electrode of the first transistor T1 is connected to a high level signal (high level voltage) Vdd, and a drain electrode of the first transistor T1 is connected to a second node N2.

For example, the first transistor T1 can have a dual gate type transistor where two gate electrodes are provided.

The second transistor T2 as an emitting transistor is switched according to an emission signal Em. A gate electrode of the second transistor T2 is connected to the emission signal Em, a source electrode of the second transistor T2 is connected to the second node N2, a drain electrode of the second transistor T2 is connected to a fourth node N4.

The third transistor T3 is switched according to a scan2 signal Sc2. A gate electrode of the third transistor T3 is connected to the scan2 signal Sc2, a source electrode of the third transistor T3 is connected to the second node N2, and a drain electrode of the third transistor T3 is connected to the first node N1.

The fourth transistor T4 is switched according to the scan2 signal Sc2. A gate electrode of the fourth transistor T4 is connected to the scan2 signal Sc2, a source electrode of the fourth transistor T4 is connected to the fourth node N4, and a drain electrode of the fourth transistor T4 is connected to a reference signal Vrf.

The fifth transistor T5 is switched according to the emission signal Em. A gate electrode of the fifth transistor T5 is connected to the emission signal Em, a source electrode of the fifth transistor T5 is connected to a third node N3, and a drain electrode of the fifth transistor T6 is connected to the reference signal Vrf.

The sixth transistor T6 is switched according to a scan1 signal Sc1. A gate electrode of the sixth transistor T6 is connected to the scan1 signal Sc1, a source electrode of the sixth transistor T6 is connected to the third node N3, and a drain electrode of the sixth transistor T6 is connected to the shared data signal Vdas or the private data signal Vdap.

The storage capacitor Cs stores the shared data signal Vdas or the private data signal Vdap and a threshold voltage Vth of the first transistor T1. A first capacitor electrode of the storage capacitor Cs is connected to the first node N1, and a second capacitor electrode of the storage capacitor Cs is connected to the third node N3.

The light emitting diode De is connected between the second and fourth transistors T2 and T4 and emits a light of a luminance proportional to a current of the first transistor T1. An anode of the light emitting diode De is connected to the fourth node N4, and a cathode of the light emitting diode De is connected to a low level signal (low level voltage) Vss.

A hemicylindrical lens focusing a light along up and down directions toward a front direction and spreading a light along left and right directions is disposed on the light emitting diode De of the shared subpixel SPs to obtain a wide viewing angle mode along the left and right directions, and a hemispherical lens focusing a light along up, down, left and right directions toward a front direction is disposed on the light emitting diode De of the private subpixel SPp to obtain a narrow viewing angle mode along the left and right directions.

The gate electrode of the first transistor T1, the first capacitor electrode of the storage capacitor Cs and the drain electrode of the third transistor T3 constitute the first node N1, and the drain electrode of the first transistor T1, the source electrode of the second transistor T2 and the source electrode of the third transistor T3 constitute the second node N2. The second capacitor electrode of the storage capacitor Cs, the source electrode of the fifth transistor T5 and the source electrode of the sixth transistor constitute the third node, and the drain electrode of the second transistor T2, the source electrode of the fourth transistor T4 and an anode of the light emitting diode De constitute the fourth node N4.

The light emitting diode De of the shared subpixel SPs and the light emitting diode De of the private subpixel SPp can be independently driven to emit lights of luminances corresponding to the shared data signal Vdas of a wide viewing angle and the private data signal Vdap of a narrow viewing angle, respectively.

Each of the shared subpixel SPs and the private subpixel SPp is driven through an initialization period, a sampling period, a holding period and an emission period.

During the initialization period, the second, third, fourth and fifth transistors T2, T3, T4 and T5 are turned on due to the scan2 signal Sc2 and the emission signal Em of a logic low level, and the sixth transistor T6 is turned off due to the scan1 signal Sc1 of a logic high level. In the present disclosure, a logic high level is also referred to herein as a high logic level, and a logic low level is also referred to herein as a low logic level. Since the reference signal Vrf is applied to the first and third nodes N1 and N3, the first and second capacitor electrodes of the storage capacitor Cs and the gate electrode of the first transistor T1 are initialized by the reference signal Vrf.

During the sampling period, the third, fourth and sixth transistors T3, T4 and T6 are turned on due to the scan1 signal Sc1 and the scan2 signal Sc2 of a logic low level, and the second and fifth transistors T2 and T5 are turned on due to the emission signal Em of a logic high level. The shared data signal Vdas or the private data signal Vdap is applied to the third node N3, the high level signal Vdd is applied to the first node N1, and the reference signal Vrf is applied to the fourth node N4. As a result, the second capacitor electrode of the storage capacitor Cs has the shared data signal Vdas or the private data signal Vdap, and the first capacitor electrode of the storage capacitor Cs has a sum of a difference between the shared data signal Vdas or the private data signal Vdap and the reference signal Vrf and the threshold voltage Vth (Vdas−Vrf+Vth or Vdap−Vrf+Vth). Accordingly, the threshold voltage Vth is stored in the storage capacitor Cs.

During the holding period, the second, third, fourth, fifth and sixth transistors T2, T3, T4, T5 and T6 are turned off due to the scan1 signal Sc1, the scan2 signal Sc2 and the emission signal Em of a logic high level. As a result, the second capacitor electrode of the storage capacitor Cs is kept as the shared data signal Vdas or the private data signal Vdap, and the first capacitor electrode of the storage capacitor Cs is kept as a sum of a difference between the shared data signal Vdas or the private data signal Vdap and the reference signal Vrf and the threshold voltage Vth (Vdas−Vrf+Vth or Vdap−Vrf+Vth).

During the emission period, the second and fifth transistors T2 and T5 are turned on due to the emission signal Em of a logic low level, and the third, fourth and sixth transistors T3, T4 and T6 are turned off due to the scan1 signal Sc1 and the scan2 signal Sc2 of a logic high level. The reference signal Vrf is applied to the third node N3. As a result, a current proportional to a square of a value ((Vdas−Vrf+Vth-Vdd)-Vth=Vdas-Vrf-Vdd or ((Vdap−Vrf+Vth-Vdd)-Vth=Vdap-Vrf-Vdd)) obtained by subtracting the threshold voltage Vth from a gate-source voltage Vgs flows through the first transistor T1, and the light emitting diode De emits a light of a luminance corresponding to the current flowing through the first transistor T1.

Although each of the shared subpixel SPs and the private subpixel SPp has a 6T1C structure having six transistors and one storage capacitor in the embodiment of FIG. 2, each of the shared subpixel SPs and the private subpixel SPp can have one of a 3T1C structure having three transistors and one storage capacitor, a 7T1C structure having seven transistors and one storage capacitor and a 8T1C structure having eight transistors and one storage capacitor in another embodiment.

In the viewing angle switchable display device 110, the mixed image data RGBm, the data enable signal DE, the shared data enable signal DEs and the private data enable signal Dep are transmitted from the image processing unit 115 to the timing controlling unit 120.

Figure 3:
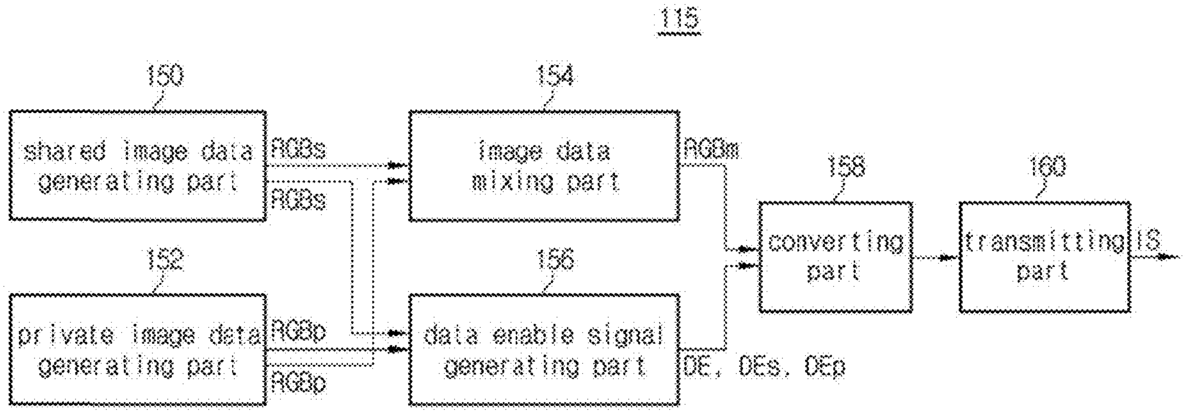
FIG. 3 is a view showing an image processing unit connected to a viewing angle switchable display device according to an embodiment of the present disclosure.
Figure 4:
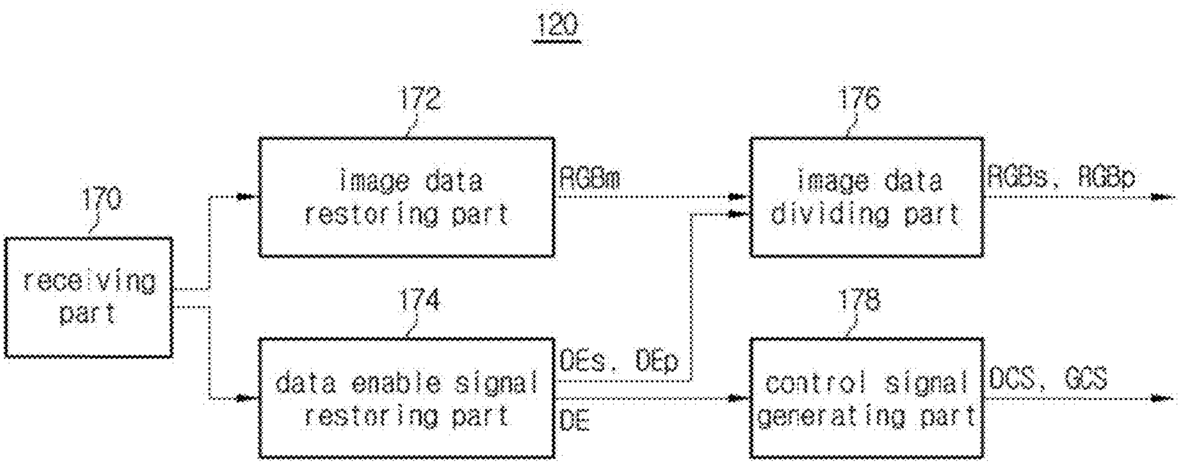
FIG. 4 is a view showing a timing controlling unit of a viewing angle switchable display device according to an embodiment of the present disclosure.

FIG. 3 is a view showing an image processing unit connected to a viewing angle switchable display device according to an embodiment of the present disclosure, FIG. 4 is a view showing a timing controlling unit of a viewing angle switchable display device according to an embodiment of the present disclosure, and FIG. 5 is a view showing a plurality of signals of a viewing angle switchable display device according to an embodiment of the present disclosure.

Referring to FIGS. 3 and 5, the image processing unit 115 connected to the viewing angle switchable display device 110 according to an embodiment of the present disclosure includes a shared image data generating part 150, a private image data generating part 152, an image data mixing part 154, a data enable signal generating part 156, a converting part 158 and a transmitting part 160.

The shared image data generating part 150 generates the shared image data RGBs corresponding to the shared image IMs (of FIG. 6B) of a wide viewing angle along left and right directions displayed by the shared subpixel SPs of the shared area SA (of FIG. 6A) of the display panel 140 and transmits the shared image data RGBs to the image data mixing part 154 and the data enable signal generating part 156.

For example, the shared image data RGBs can have a resolution of 1920*3*1080 of full high definition (FHD) corresponding to a number of the shared subpixels SPs of red, green and blue colors in a horizontal pixel line of the display panel 140, and a number of the shared subpixels SPs in a vertical pixel line.

The shared image data RGBs of first and third periods TP1 and TP3 (of FIG. 5) corresponding to the shared subpixel SPs of the shared area SA can have a gray level data S (of FIG. 5) of the shared image IMs of a wide viewing angle, and the shared image data RGBs of second and fourth periods TP2 and TP4 (of FIG. 5) corresponding to the private subpixel SPp of the shared area SA can have a gray level data 0 (of FIG. 5) of a black color.

The private image data generating part 152 generates the private image data RGBp corresponding to the private image IMp (of FIG. 6C) of a narrow viewing angle along left and right directions displayed by the private subpixel SPp of the private area PA (of FIG. 6A) of the display panel 140 and transmits the private image data RGBp to the image data mixing part 154 and the data enable signal generating part 156.

For example, the private image data RGBp can have a resolution of 1920*3*1080 of full high definition (FHD) corresponding to a number of the private subpixels SPp of red, green and blue colors in a horizontal pixel line of the display panel 140, and a number of the private subpixels SPp in a vertical pixel line.

The shared image data RGBs of first and third periods TP1 and TP3 corresponding to the shared subpixel SPs of the private area PA can have a gray level data 0 of a black color, and the private image data RGBp of second and fourth periods TP2 and TP4 corresponding to the private subpixel SPp of the private area PA can have a gray level data P (of FIG. 5) of the private image IMp of a narrow viewing angle.

The image data mixing part 154 generates the mixed image data RGBm by mixing the shared image data RGBs transmitted from the shared image data generating part 150 and the private image data RGBp transmitted from the private image data generating part 152 and transmits the mixed image data RGBm to the converting part 158.

For example, the mixed image data RGBm can have a resolution of 1920*3*1080 of full high definition (FHD) corresponding to a number of the shared subpixels SPs or the private subpixels SPp of red, green and blue colors in a horizontal pixel line of the display panel 140, and a number of the shared subpixels SPs or the private subpixels SPp in a vertical pixel line.

The mixed image data RGBm of the first and third periods TP1 and TP3 corresponding to the shared subpixel SPs of the shared area SA can have a gray level data S of the shared image IMs of a wide viewing angle, and the mixed image data RGBm of the second and fourth periods TP2 and TP4 corresponding to the private subpixel SPp of the private area PA can have a gray level data P of the private image IMp of a narrow viewing angle.

The data enable signal generating part 156 generates the data enable signal DE based on a start point and an end point of a valid period of the shared image data RGBs transmitted from the shared image data generating part 150 and the private image data RGBp transmitted from the private image data generating part 152 and transmits the data enable signal DE to the converting part 158.

For example, the data enable signal DE can have a logic high level Vh (of FIG. 5) during the first to fourth periods TP1 to TP4 between the start point and the end point of a valid data and can have a logic low level Vl (of FIG. 5) during the other period.

Further, the data enable signal generating part 156 generates the shared data enable signal DEs corresponding to the shared area SA and the private data enable signal DEp corresponding to the private area PA from the data enable signal DE and transmits the shared data enable signal DEs and the private data enable signal DEp to the converting part 158.

For example, the shared data enable signal DEs can have a logic high level Vh during the first and third periods TP1 and TP3 corresponding to the shared area SA and can have a logic low level Vl during the second and fourth periods TP2 and TP4 corresponding the private area PA. The private data enable signal DEp can have a logic high level Vh during the second and fourth periods TP2 and TP4 corresponding to the private area PA and can have a logic low level Vl during the first and third periods TP1 and TP3 corresponding the shared area SA.

The converting part 158 converts the mixed image data RGBm received from the image data mixing part 154, the data enable signal DE, the shared data enable signal DEs and the private data enable signal DEp received from the data enable signal generating part 156 into serial data and transmits the serial data to the transmitting part 160.

The transmitting part 160 converts the serial data transmitted from the converting part 158 into an interface signal and transmits the interface signal to the timing controlling unit 120.

For example, the interface signal of the transmitting part 160 can be a transmission signal of a low voltage differential signaling (LVDS) or a transmission signal of an embedded display port (EDP).

The image processing unit 115 can further include a clock signal generating part that generates the clock signal CLK using the shared image data RGBs and the private image data RGBp and transmits the clock signal CLK to the converting part 158.

In the viewing angle switchable display device 110 according to an embodiment of the present disclosure, the image processing unit 115 does not transmit the shared image data RGBs having a first resolution (e.g., 1920*3*1080) and the private image data RGBp having a first resolution (e.g., 1920*3*1080) to the timing controlling unit 120. Instead, the image processing unit 115 transmits the mixed image data RGBm having a first resolution (e.g., 1920*3*1080) to the timing controlling unit 120. Since an amount of the image data and a speed of the clock signal are reduced, a property of an electromagnetic interference is improved. Further, since a noise is reduced, a display quality of an image is improved.

Referring to FIGS. 4 and 5, the timing controlling unit 120 of the viewing angle switchable display device 110 according to an embodiment of the present disclosure includes a receiving part 170, an image data restoring part 172, a data enable signal restoring part 174, an image data dividing part 176 and a control signal generating part 178.

The receiving part 170 converts the interface signal received from the image processing unit 115 into the serial data and transmits the serial data to the image data restoring part 172 and the data enable signal restoring part 174.

The image data restoring part 172 restores the mixed image data RGBm from the serial data transmitted from the receiving part 170 and transmits the mixed image data RGBm to the image data dividing part 176.

The data enable signal restoring part 174 restores the data enable signal DE, the shared data enable signal DEs and the private data enable signal DEp from the serial data transmitted from the receiving part 170. The data enable signal restoring part 174 transmits the shared data enable signal DEs and the private data enable signal DEp to the image data dividing part 176 and transmits the data enable signal DE to the control signal generating part 178.

The image data dividing part 176 divides the shared image data RGBs from the mixed image data RGBm received from the image data restoring part 172 based on the shared data enable signal DEs transmitted from the data enable signal restoring part 174 and divides the private image data RGBp from the mixed image data RGBm received from the image data restoring part 172 based on the private data enable signal DEp transmitted from the data enable signal restoring part 174. The image data dividing part 176 transmits the shared image data RGBs and the private image data RGBp to the data driving unit 125.

The control signal generating part 178 generates the data control signal DCS and the gate control signal GCS from the data enable signal DE transmitted from the data enable signal restoring part 174. The control signal generating part 178 transmits the data control signal DCS to the data driving unit 125 and transmits the gate control signal GCS to the first and second gate driving units 130 and 135.

The timing controlling unit 120 can further include a clock signal restoring part restoring the clock signal CLK from the serial data transmitted from the receiving part 170 and transmitting the clock signal CLK to a control signal generating part 178.

The shared image of a wide viewing angle and the private image of a narrow viewing angle of the viewing angle switchable display device 110 will be illustrated with reference to drawings.

Figure 6B:
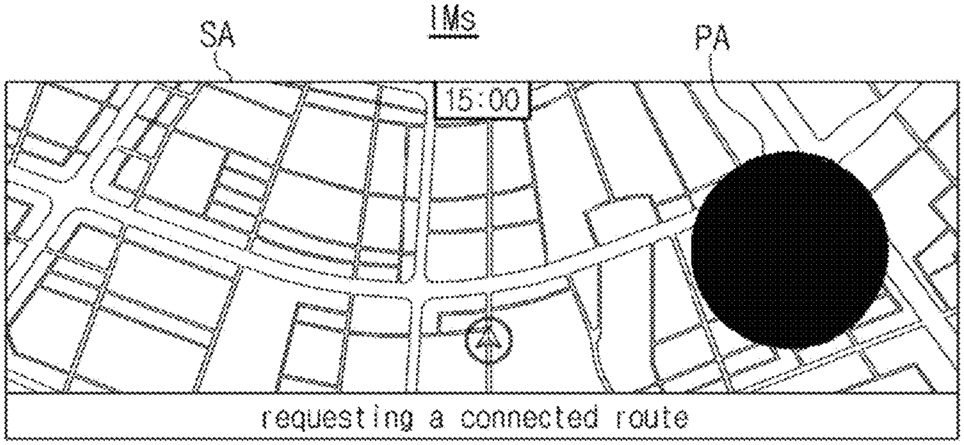
FIG. 6B is a view showing a shared image of a viewing angle switchable display device according to an embodiment of the present disclosure.
Figure 6C:
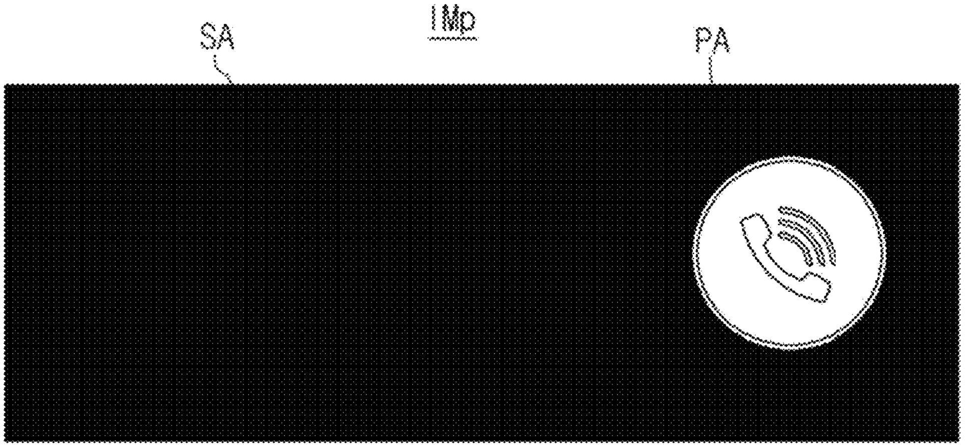
FIG. 6C is a view showing a private image of a viewing angle switchable display device according to an embodiment of the present disclosure.

FIG. 6A is a view showing a mixed image, a shared data enable signal and a private data enable signal of a viewing angle switchable display device according to an embodiment of the present disclosure, FIGS. 6B and 6C are views showing a shared image and a private image, respectively, of a viewing angle switchable display device according to an embodiment of the present disclosure.

Referring to FIGS. 6A, 6B and 6C, a mixed image IMm of the viewing angle switchable display device 110 according to an embodiment of the present disclosure includes the shared image IMs displayed in a predetermined shared area SA with a relatively wide viewing angle and the private image IMp displayed in a predetermined private area PA with a relatively narrow viewing angle.

The shared image IMs is displayed as black in the private area PA, and the private image IMp is displayed as black in the shared area SA.

Since the shared image IMs of the shared area SA is displayed with a wide viewing angle, all of a plurality of users can watch the shared image IMs of the shared area SA. Since the private image IMp of the private area PA except for the shared area SA is displayed with a narrow viewing angle, only one in front of the private area PA among the plurality of users can watch the private image IMp.

For first and fourth horizontal lines HL1 and HL4 overlapping only the shared area SA, the shared data enable signal DEs has a logic high level Vh during all periods, and the private data enable signal DEp has a logic low level Vl during all periods.

For second and third horizontal lines HL2 and HL3 overlapping the shared area SA and the private area PA, the shared data enable signal DEs has a logic high level Vh during a period overlapping the shared area SA and has a logic low level Vl during a period overlapping the private area PA. The private data enable signal DEp has a logic high level Vh during a period overlapping the private area PA and has a logic low level Vl during a period overlapping the shared area SA.

Consequently, in the viewing angle switchable display device 110, since the image processing unit 115 transmits the mixed image data RGBm having the same data amount as each of the shared image data RGBs and the private image data RGBp instead of the shared image data RGBs and the private image data RGBp to the timing controlling unit 120, an amount of the image data and a speed of a clock signal are reduced, and a property of an electromagnetic interference is improved. Further, a noise is reduced, and a display quality of an image is improved. In addition, a driving of a low power consumption is obtained.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims and their equivalents.

What is claimed is:

1. A viewing angle switchable display device, comprising:

a timing controlling unit configured to generate shared image data, private image data, a data control signal and a gate control signal from an interface signal corresponding to mixed image data, a data enable signal, a shared data enable signal and a private data enable signal received from an image processing unit;

a data driving unit configured to generate a shared data signal and a private data signal using the shared image data, the private image data and the data control signal;

a gate driving unit configured to generate a gate signal using the gate control signal; and a display panel including a shared subpixel and a private subpixel and configured to display an image using the shared data signal, the private data signal and the gate signal, wherein the image processing unit comprises:

a shared image data generating part configured to generate the shared image data;

a private image data generating part configured to generate the private image data; and an image data mixing part configured to generate the mixed image data by mixing the shared image data and the private image data.

2. The viewing angle switchable display device of claim 1, wherein the image processing unit further comprises:

a data enable signal generating part configured to generate the data enable signal based on a start point and an end point of a valid period of the shared image data and the private image data, and generate the shared data enable signal and the private data enable signal from the data enable signal.

3. The viewing angle switchable display device of claim 2, wherein the image processing unit further comprises:

a converting part configured to convert the mixed image data, the shared data enable signal and the private data enable signal into serial data; and a transmitting part configured to convert the serial data into the interface signal and transmit the interface signal to the timing controlling unit.

4. The viewing angle switchable display device of claim 1, wherein the timing controlling unit comprises:

a receiving part configured to convert the interface signal received from the image processing unit into serial data;

an image data restoring part configured to restore the mixed image data from the serial data; and a data enable signal restoring part configured to restore the data enable signal, the shared data enable signal and the private data enable signal from the serial data.

5. The viewing angle switchable display device of claim 4, wherein the timing controlling unit further comprises:

an image data dividing part configured to divide the shared image data from the mixed image data based on the shared data enable signal, and divide the private image data from the mixed image data based on the private data enable signal; and a control signal generating part configured to generate the data control signal and the gate control signal from the data enable signal.

6. The viewing angle switchable display device of claim 1, wherein a resolution of the mixed image data is same as a resolution of each of at least one of the shared image data and the private image data.

7. The viewing angle switchable display device of claim 1, wherein a mixed image corresponding to the mixed image data includes:

a shared image corresponding to the shared image data, and configured to be displayed in a shared area with a wide viewing angle, and a private image corresponding to the private image data, and configured to be displayed in a private area with a narrow viewing angle.

8. The viewing angle switchable display device of claim 7, wherein the shared image is displayed as black in the private area, and wherein the private image is displayed as black in the shared area.

9. The viewing angle switchable display device of claim 7, wherein the shared image data of a first period corresponding to the shared subpixel of the shared area and the shared subpixel of the private area has a gray level data of the shared image, wherein the shared image data of a second period corresponding to the private subpixel of the shared area and the private subpixel of the private area has a gray level data of black, wherein the private image data of the first period has a gray level data of black, and wherein the private image data of the second period has a gray level data of the private image.

10. The viewing angle switchable display device of claim 9, wherein the mixed image data of the first period has a gray level data of the shared image, and wherein the mixed image data of the second period has a gray level data of the private image.

11. The viewing angle switchable display device of claim 9, wherein the data enable signal has a high logic level during the first and second periods, wherein the shared data enable signal has a high logic level during the first period and has a low logic level during the second period, and wherein the private data enable signal has a low logic level during the first period and has a high logic level during the second period.

12. The viewing angle switchable display device of claim 1, wherein each of the shared subpixel and the private subpixel comprises:

a first transistor connected to a high level signal;

a second transistor configured to be switched according to an emission signal and connected to the first transistor;

a third transistor configured to be switched according to a second scan signal and connected to the first transistor;

a fourth transistor switched according to the second scan signal and connected to the second transistor;

a fifth transistor switched according to the emission signal and connected to a reference signal; and a sixth transistor switched according to a first scan signal and connected to one of the shared data signal and the private data signal.

13. The viewing angle switchable display device of claim 12, wherein each of the shared subpixel and the private subpixel further comprises:

a storage capacitor connected between the first, third and sixth transistors; and a light emitting diode connected between the second and fourth transistors and a low level signal.

14. A viewing angle switchable display device, comprising:

a timing controlling unit configured to generate shared image data and private image data based on mixed image data;

a data driving unit configured to generate a shared data signal and a private data signal based on the shared image data, the private image data and a data control signal;

a gate driving unit configured to generate a gate signal; and a display panel including a plurality of subpixels, each of the plurality of subpixels including a shared subpixel and a private subpixel, wherein the shared subpixels and the private subpixels are configured to selectively display images based on the shared data signal and the private data signal, and wherein a mixed image corresponding to the mixed image data includes:

a shared image corresponding to the shared image data, and configured to be displayed in a shared area with a wide viewing angle, and a private image corresponding to the private image data, and configured to be displayed in a private area with a narrow viewing angle.

15. The viewing angle switchable display device of claim 14, wherein a resolution of the mixed image data is same as a resolution of each of the shared image data and the private image data.

16. The viewing angle switchable display device of claim 14, wherein the shared image is displayed as black in the private area, and wherein the private image is displayed as black in the shared area.

17. The viewing angle switchable display device of claim 14, further comprising an image processing unit configured to transmit an interface signal corresponding to the mixed image data to the timing controlling unit, the image processing unit comprising:

a shared image data generating part configured to generate the shared image data;

a private image data generating part configured to generate the private image data; and an image data mixing part configured to generate the mixed image data by mixing the shared image data and the private image data.

* * * * *